United States Patent [19]

Lagana

[11] Patent Number: 4,976,280

[45] Date of Patent: Dec. 11, 1990

[54] VALVE SPRING COMPRESSION TOOL

[76] Inventor: Robert Lagana, 197 Main St., Eastchester, N.Y. 10707

[21] Appl. No.: 472,965

[22] Filed: Jan. 31, 1990

[51] Int. Cl.[5] ........................ F16K 43/00; B23P 19/04

[52] U.S. Cl. ........................ 137/315; 29/217; 29/227

[58] Field of Search ................. 29/215, 217, 218, 219, 29/220; 137/315; 254/10.5; 123/90.1

[56] References Cited

U.S. PATENT DOCUMENTS

| | | | |
|---|---|---|---|
| 971,375 | 9/1910 | Hays | 29/217 |
| 1,037,691 | 9/1912 | Wanamaker | 29/217 |
| 1,616,482 | 2/1927 | Angrove | 29/217 |
| 2,965,958 | 12/1960 | Gribble | 29/217 |
| 3,010,192 | 11/1961 | Rufer et al. | 29/217 |
| 3,984,909 | 10/1976 | Velazquez | 29/217 |
| 4,654,944 | 4/1987 | Graf | 29/217 |

FOREIGN PATENT DOCUMENTS

| | | | |
|---|---|---|---|
| 2881 | 7/1931 | Australia | 29/217 |
| 1188888 | 3/1965 | Fed. Rep. of Germany | 29/217 |
| 248969 | 3/1926 | United Kingdom | 29/217 |
| 265003 | 2/1927 | United Kingdom | 29/217 |

*Primary Examiner*—George L. Walton
*Attorney, Agent, or Firm*—Richard L. Miller

[57] ABSTRACT

A valve spring compression tool is provided and consists of a C-shaped frame having at a first extremity a fixed pad with a central aperture therethrough. A structure at a second extremity of the C-shaped frame is for moving a movable pad toward and away from the fixed pad in an axial alignment. When a valve head of a valve bears against the fixed pad a valve spring can be compressed to release a pair of retaining members from a valve stem through the central aperture so that the valve can then be disassembled.

4 Claims, 1 Drawing Sheet

VALVE SPRING COMPRESSION TOOL

BACKGROUND OF THE INVENTION

The instant invention relates generally to tools and more specifically it relates to a valve spring compression tool.

Numerous tool have been provided in the prior art that are adapted to compress the springs on the stems of valves in internal combustion engines for the purpose of facilitating the removal and installation of such valves. For example, U.S. Pat. Nos. 1,364,644 to Rees; 1,598,754 to Sulentic; 1,607,667 to Essen; 1,826,908 to Wainwright; 2,741,020 to Arthur; French patent numbered 545,328 to Valade; British patent numbered 77,620 all are illustrative of such prior art. While these units may be suitable for the particular purpose to which they address, they would not be as suitable for the purpose of the present invention as hereafter described.

SUMMARY OF THE INVENTION

A primary object of the present invention is to provide a valve spring compression tool that will overcome the shortcomings of the prior art devices.

Another object is to provide a valve spring compression tool in the form of a C-clamp to manually produce the proper force required to compress a valve spring so that the retaining members can disengage from the valve stem allowing the valve to be removed from an engine head.

An additional object is to provide a valve spring compression tool in which the movable pad can be adapted for valves with different sized heads.

A further object is to provide a valve spring compression tool that is simple and easy to use.

A still further object is to provide a valve spring compression tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
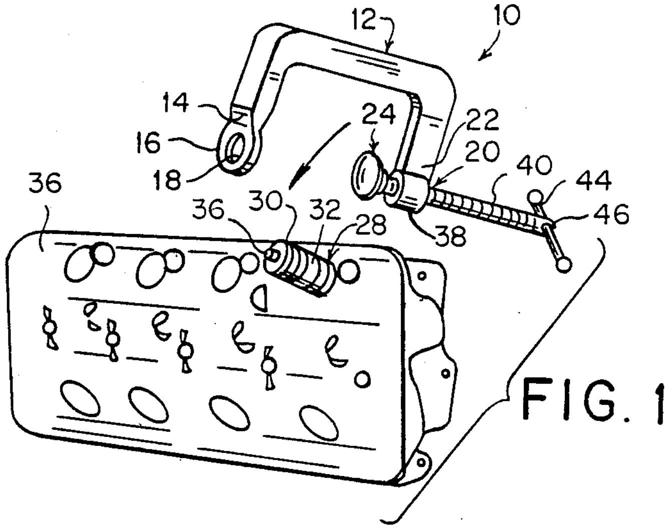
FIG. 1 is a perspective view of the instant invention ready to be used to compress a valve spring.
Figure 2:
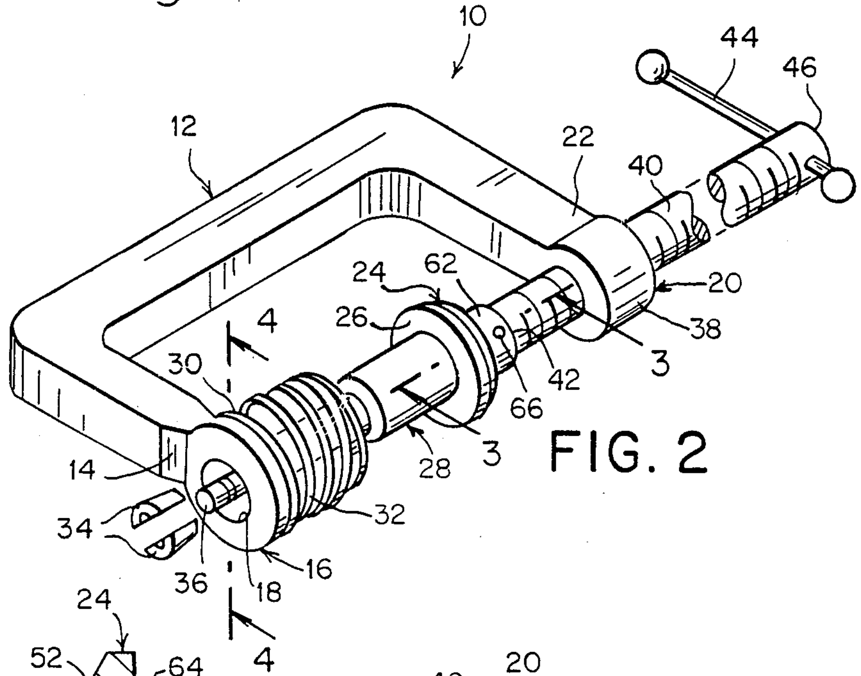
FIG. 2 is a perspective view of the instant invention with a valve spring assembly illustrated being compressed therein.

Turning now descriptively to the drawings, in which like reference characters denote like elements throughout the several views, FIG. 1 and 2 illustrate a valve spring compression tool 10 containing a C-shaped frame 12 having at a first extremity 14 a fixed pad 16 with a central aperture 18 therethrough. A structure 20 at a second extremely 22 of the C-shaped frame 12 is for moving a movable pad 24 toward and away from the fixed pad 16 in an axial alignment. When a valve head 26 of a valve 28 bears against the movable pad 24 and a valve washer 30 bears against the fixed pad 16 a valve spring 32 can be compressed to release a pair of retaining members 34 from a valve stem 36 through the central aperture 18 so that the valve 28 can then be disassembled from an engine block 36, as shown in FIG. 1 or by itself as shown in FIG. 2, when stored.

The moving structure 20 includes the second extremity 22 of the C-shaped frame 12 having an internally threaded bore 38. An elongated operating screw 40 is in engagement with the internally threaded bore 38. An elongated operating screw 40 is in engagement with the internally threaded bore 38 and has an inner end 42 rotatively coupled to the movable pad 24. A handle 44 is transversely attached to outer end 46 of the operating screw 40 for applying torque to the operating screw 40 so that the movable pad 24 will apply the proper force to the valve head 26 for compressing the valve spring 32.

Figure 4:
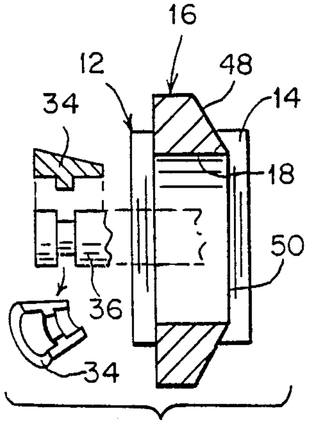
FIG. 4 is a cross sectional view taken along line 4—4 in FIG. 2 showing the fixed pad in greater detail.
Figure 3:
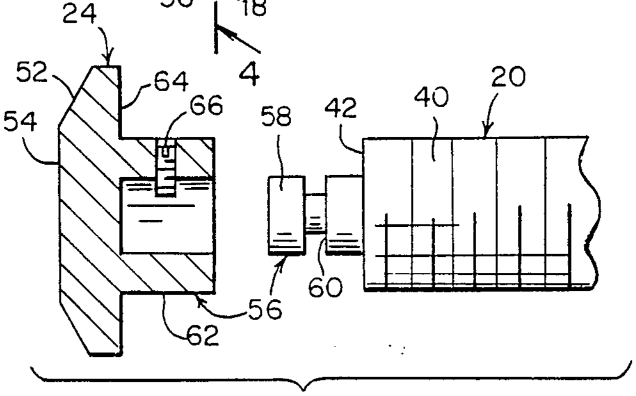
FIG. 3 is a cross sectional view taken along line 3—3 in FIG. 2 showing the movable pad in greater detail.

The fixed pad 16, as best seen in FIG. 4, has a chamfer 48, typically set at thirty degrees, with respect to a surface 50 that bears against the valve washer 30. The movable pad 24, as best seen in FIG. 3, has a chamfer 52, also typically set at thirty degrees, with respect to a surface 54 that bears against the valve head 26 so that the tool 10 can properly align any sized valve 28 between the fixed pad 16 and the movable pad 24 when compressing the valve spring 32.

A sleeve structure 56 is provided for removably rotatively coupling the movable pad 24 to the inner end 42 of the operating screw 40 so that the movable pad 24 can be removed and replaced when needed. The sleeve structure 56 includes the inner end 42 of the operating screw 40 having a stub shaft 58 extending therefrom with an annular groove 60 thereabout. The movable pad 24 has a boss 62 extended from a surface 64 opposite from the chamfer 52 and is of a size to fit over the stub shaft 58. A set screw 66 is threaded transversely into the boss 62 to engage with the annular groove 60 so as to rotatively hold the movable pad 24 in place thereon.

To operate the tool 10 a mechanic simply paces the fixed pad against the valve washer and then tightens up on the operating screw 40 until the movable pad 24 bears against the valve head 26. When the handle 44 is continued to be turned the valve spring 32 will compress to release the retaining members 34, which are tapered keys, as best seen in FIGS. 2 and 4. The operating screw 40 can then be turned in an opposite direction to release tension on the valve spring 32 so that the valve 28 can be disassembled. To assemble the valve 28 the above procedure is just reversed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A valve spring compression tool comprising:

(a) a C-shaped frame having at a first extremity, a fixed, circular pad with a central aperture therethrough defining a ring-form surface for bearing against a valve washer;

(b) a movable pad having a circular surface that bears against the valve head; and, (c) means at a second extremity of said C-shaped frame, for moving said movable pad toward and away from said fixed pad in an axial alignment so that when a valve head of a valve bears against said movable pad and a valve washer bears against said fixed pad a valve spring can be compressed to release a pair of retaining members from a valve stem through said central aperture so that the valve can then be disassembled from an engine block, the ring-form bearing surface of the fixed pad and the circular bearing surface of the movable pad each having an encircling chamfer so that the tool can be precisely aligned with valves of different sizes concentrically with the fixed and movable pads when compressing the valve spring.

2. A valve spring compression tool as recited in claim 1, wherein said moving means includes;

(a) said second extremity of said C-shaped frame having an internally threaded bore;

(b) an elongated operating screw in engagement with said internally threaded bore and having inner end coupled to said movable pad; and (c) a handle transversely attached to outer end of said operating screw for applying torque to said operating screw so that said movable pad will apply the proper force to the valve head for compressing the valve spring.

3. A valve spring compression tool as recited in claim 2, further including a means for removably rotatively coupling said movable pad to said inner end of said operating screw so that said movable pad can be removed and replaced when needed.

4. A valve spring compression tool as recited in claim 3, wherein said removably coupling means includes;

(a) said inner end of said operating screw having a stub shaft extending therefrom with an annular groove thereabout;

(b) said movable pad having a boss extending from a surface opposite from said chamfer and being of a size to fit over said stub shaft; and (c) a set screw threaded transversely into said boss to engaged with said annular groove so as to rotatively hold said movable pad in place thereon.

* * * * *